United States Patent
Mes et al.

(10) Patent No.: US 11,774,282 B2
(45) Date of Patent: Oct. 3, 2023

(54) PYRANOMETER DOME SOILING DETECTION WITH LIGHT SENSORS

(71) Applicant: OTT HydroMet B.V., Delft (NL)

(72) Inventors: Joop Mes, Pijnacker (NL); Thijs Bergmans, Delft (NL)

(73) Assignee: OTT HydroMet B.V., Delft (NL)

( * ) Notice: Subject to any disclaimer, the term of this patent is extended or adjusted under 35 U.S.C. 154(b) by 0 days.

(21) Appl. No.: 17/561,700

(22) Filed: Dec. 23, 2021

(65) Prior Publication Data

US 2022/0196469 A1 Jun. 23, 2022

(30) Foreign Application Priority Data

Dec. 23, 2020 (EP) .................................... 20216844

(51) Int. Cl.
  *G01J 1/42* (2006.01)
  *G01N 21/59* (2006.01)
  *G01N 21/94* (2006.01)

(52) U.S. Cl.
  CPC ............... *G01J 1/42* (2013.01); *G01N 21/59* (2013.01); *G01N 21/94* (2013.01); *G01J 2001/4285* (2013.01)

(58) Field of Classification Search
  CPC ................. G01J 1/42; G01J 2001/4285; G01J 2001/4266; G01J 1/0271; G01J 1/0228; G01N 21/59; G01N 21/94; G01N 21/958; G01N 2021/945
  USPC ...................................................... 250/203.4
  See application file for complete search history.

(56) References Cited

U.S. PATENT DOCUMENTS

| | | | |
|---|---|---|---|
| 6,995,355 B2 * | 2/2006 | Rains, Jr. ............... | H05B 35/00 362/235 |
| 2011/0127992 A1 * | 6/2011 | Shimotomai ............. | G01J 1/08 324/96 |
| 2019/0145907 A1 * | 5/2019 | Van Mechelen .......... | G01J 1/02 356/239.1 |

FOREIGN PATENT DOCUMENTS

| | | |
|---|---|---|
| DE | 102018204146 A1 | 9/2019 |
| JP | 2007132730 A | 5/2007 |

OTHER PUBLICATIONS

International Searching Authority, European Patent Office, International Search Report and the Written Opinion, dated Mar. 14, 2022, 12 pages.

(Continued)

*Primary Examiner* — Thanh Luu
*Assistant Examiner* — Mai Thi Ngoc Tran
(74) *Attorney, Agent, or Firm* — Ference & Associates LLC (57) ABSTRACT

One embodiment provides a pyranometer, including: a dome enclosing a cavity; at least one light emitting source arranged such that light exterior to the dome does not directly impinge on the at least one light emitting source; a diffusor; wherein the at least one light emitting source is configured to emit light substantially directed to a portion of the diffusor, and wherein the diffusor is configured to diffuse the light emitted from the at least one light emitting source on an inner surface of the dome; and one or more first light detecting sensors arranged in the cavity and configured to measure an intensity of the light reflected from the dome and impinging on the one or more first light detecting sensors. Other aspects are described and claimed.

12 Claims, 4 Drawing Sheets

(56) References Cited

OTHER PUBLICATIONS

N. Geuder et al., "Soiling of irradiation sensors and methods for soiling correction", Solar Energy, vol. 80, No. 11, Nov. 1, 2006, 8 pages, Elsevier.

\* cited by examiner

PYRANOMETER DOME SOILING DETECTION WITH LIGHT SENSORS

The present application claims priority to European Patent Application No. EP20216844, which was filed on Dec. 23, 2020, the contents of which are hereby incorporated by reference.

TECHNICAL FIELD

The present invention relates to a pyranometer allowing for a soiling monitoring and to a method of detecting a soiling on a dome of a pyranometer.

BACKGROUND

A pyranometer is a measuring instrument that detects the solar irradiance amount incident on a surface. According to the working principle for the measurement of solar irradiance, pyranometers can be grouped in two different categories, that is thermopile-based sensor pyranometers and silicon semiconductor-based pyranometers. As to the thermopile-based sensor pyranometers, the solar irradiance particularly is measured by a sensor based on thermoplies and designed to measure a broad band of the solar radiation flux density, substantially from a 180° field of view angle. The thermopile-based sensor is arranged below a glass dome, the latter limiting the spectral response from about 190 to about 4000 nanometers, particularly from about 300 to about 2800 nanometers, while substantially preserving the substantially 180° field of view. At the same time, the glass dome has the function of protecting the thermopile-based sensor from the external environment.

Pyranometers can be used in conjunction with other systems, among others solar simulators, photovoltaic systems and meteorological stations. In these systems, the solar radiation measured by the pyranometer is used for determining other parameters and/or performances of the system, e.g. the photovoltaic module effective power. Therefore, the measurement accuracy of a pyranometer is one important aspect of this measuring instrument.

Conventionally, in order to determine the solar radiation with high accuracy, it is important to be able to determine a transparency of the glass dome which ideally should be substantially continuous over time. Any soiling on the dome may affect the measurement of solar radiation, since the soiling prevents light from passing through, causing an error to the irradiance measurement value.

In order to determine the amount of soiling on the outer surface of the glass dome, pyranometers may be provided with a monitoring system that informs a user about the soiling on the outer surface of the glass dome. This monitoring system provides an indication of measurement reliability and allows to plan maintenance, i.e. cleaning, of the glass dome.

Conventional soiling monitoring systems usually comprise a light source for emitting light directed to the glass dome and a light sensor arranged to receive light from the light source. The light sensor is configured to provide a signal providing an indication for an amount of light received by the light sensor. Soiling particles reflect the light from the light source back to the light sensor. The reflected light is then received by the light sensor, the latter generating a signal that corresponds to the amount of soiling covering the glass dome.

Additionally, in conventional systems a direct transmission of sun light may be measured and compared to a measurement previously done with a clean glass dome. Furthermore, other conventional methods involve using a cameras for checking the soiling on the glass dome.

Accordingly, there is the need to improve the accuracy of conventional monitoring systems such that soiling on the glass dome of the pyranometer can be determined with high accuracy.

SUMMARY OF THE INVENTION

An object of the present invention is providing a pyranometer and method allowing to determine with a high accuracy the soiling on the dome of the pyranometer.

The above objects are solved by the features of the independent claims, wherein particular embodiments are subject of the dependent claims.

According to an aspect, there is provided a pyranometer comprising: a dome enclosing a cavity, at least one light emitting source arranged such that a light exterior to the dome does not directly impinge on the at least one light emitting source, a diffusor; wherein the at least one light emitting source is configured to emit light substantially directed to a portion of the diffusor, and wherein the diffusor is configured to diffuse the light emitted from the at least one light emitting source on the dome; and one or more first light detecting sensors arranged in the cavity and configured to measure an intensity of the light reflected from the inner surface of the dome and impinging on the one or more first light detecting sensors.

Advantageously, providing a diffusor arranged to diffuse the light emitted from a light emitting source on the inner surface of the glass dome, allows to substantially equally distribute the light directed to the inner surface of the dome. In other words, the light used for detecting the soiling on the dome of the pyranometer is uniformly distributed on the dome. Accordingly, the glass dome will uniformly reflect light to one or more light sensors that, in turn, will be able to correctly qualify, or even quantify, the soiling on the glass dome of the pyranometer. Advantageously, the soiling truly present on the outer surface of dome, and particularly its location on the dome, can be detected with high accuracy.

At the same time, a light emitting source arranged such that a light exterior to the dome does not directly impinge on the light emitting source can be protected by any direct incoming UV radiation. Particularly, a large part of the most damaging UV light (specifically UV-B with a wavelength between about 315 nm to about 280 nm), is also not transmitted by the diffusor toward the light emitting source. This allows to achieve a pyranometer response that is substantially flat, i.e. measuring the largest part of the UV in the solar spectrum, while preventing the most damaging UV light (specifically UV-8) to reach the light emitting source.

Advantageously, the aging of the light emitting source is reduced or prevented. As a result, at a given power input to the light emitting source, the light output will not decrease over time, particularly due to the aging. In other words, the output values (values of the light detected by the light sensors) are not affected by the aging of the sensors. Accordingly, a correction to the decrease of the light output emitted by the light emitting source due substantially to the aging is not needed. Accordingly, the soiling on the glass dome of the pyranometer can be detected with high accuracy.

Thus, there is provided a pyranometer allowing to determine, particularly qualify and/or quantify, with a high accuracy, the soiling on the glass dome of the pyranometer. Particularly, the pyranometer may further comprise a pyranometer housing comprising a chamber, wherein the least one light emitting source is located in the chamber, and at least one partition wall arranged to at least partially partition the chamber from the cavity such that the light exterior to the dome does not directly impinge on the at least one light emitting source being arranged in the chamber; particularly wherein the partition wall comprises a through opening, and wherein the diffusor is arranged in the through opening of the partition wall.

Advantageously, a diffusor located in a through opening of a partition wall that at least partly partitions a cavity underneath the glass dome, from a chamber that contains the at least one light emitting source, allows to filter or block the incoming UV radiations (particularly the UV-B light), thus advantageously protecting the light emitting source from aging. At the same time, the diffusor (particularly substantially uniformly) diffuses the light, emitted from the light emitting source, on the inner surface of the glass dome.

Further particularly, the pyranometer may comprise a plurality of first light detecting sensors arranged in the cavity.

Further particularly, the plurality of first light detecting sensor may be arranged substantially symmetrically.

Advantageously, a plurality of light detecting sensors, optionally arranged symmetrical around the diffusor, can allow determination (particularly quantification and/or qualification), with high accuracy of the soiling on the glass dome. Particularly, a plurality of first light detecting sensors may determine the azimuthal position of the soiling on the glass dome.

Further particularly, the pyranometer may comprise a solar radiation sensor being arranged to detect light exterior to the dome at least partly impinging on the solar radiation sensor through the diffusor, wherein the solar radiation sensor particularly includes at least one thermopile and/or at least one photodiode.

Further particularly, the at least one light-emitting source may be arranged such that a propagation direction of the light emitted from the light-emitting source and a longitudinal axis of the diffusor form an angle that is lower than about 90°.

Advantageously, this arrangement substantially results in a uniform distribution of the light on the glass dome while not increasing the overall dimensions of the pyranometer.

Further particularly, the pyranometer may further comprise a control unit operatively connected with the one or more first light detecting sensors, wherein the control unit is configured to compare the intensity of the light measured by the first light detecting sensor(s) with a respective pre-set light intensity value. Further particularly, the control unit may be configured to emit a soiling presence signal if the control unit determines that the intensity of the light measured by the first light detecting sensor(s) differs from the respective pre-set light intensity value(s), particularly by a specified threshold and/or factor.

Advantageously, comparing the light intensity measured by the first light detecting sensor(s) with a respective pre-set light intensity value(s), the latter corresponding to a clean dome condition (0% soiling rate), the soiling presence on the dome can be determined when the intensity of the light measured by the first light detecting sensor(s) differs from the respective pre-set light intensity value(s), particularly by a specified threshold and/or factor.

Particularly, the pyranometer may comprise a plurality of first light detecting sensors, wherein the control unit is further configured to compare the intensities of the light measured by each of the plurality first light detecting sensors. Further particularly, if a difference in the intensities of the light measured by each of the plurality of first light detecting sensors is detected by the control unit, the control unit may be configured to emit a first signal, and/or if a difference in the intensities of the light measured by each of the plurality of first light detecting sensors is not detected by the control unit, the control unit may be configured to emit a second signal, wherein the second signal is different from the first signal.

Advantageously, comparing the light intensity measured by each of the light detecting sensors and, eventually, detecting if a difference is present between the light intensities measured by the sensors (if the first light detecting sensors measure different intensity values with respect to a respective pre-set (normalized) light Intensity value), it Is possible to correctly quantify the soiling amount and/or the spatial soiling distribution over the dome. Further particularly, if substantially no difference is present or determined between the light intensities measured by the light detecting sensors with respect to a respective pre-set (normalized) light intensity value, a 0% soiling rate can be determined (that is the light intensities measured by the first light detecting sensors simultaneously substantially correspond to the respective pre-set (normalized) light intensity value(s), particularly within a threshold and/or factor). Alternatively, a completely symmetrical/even soiling is determined, if the light intensities measured by the first light detecting sensors do not correspond to the respective pre-set (normalized) light intensity value(s), and the first light detecting sensors substantially measure the same light intensity. Accordingly, the control unit is configured to emit a correspondent signal indicating a 0% soiling rate or a symmetrical/even soiling rate. In contrast, if a difference is present or determined between the light intensities measured by the light detecting sensors, an uneven soiling rate is determined. Accordingly, the control unit emits a different correspondent signal.

Further particularly, if a difference in the intensities of the light measured by the plurality of first light detecting sensors is detected by the control unit, the control unit may be configured to determine an azimuthal angle of a point on the dome corresponding to a soiling accumulation, wherein the azimuthal angle is determined based on the difference between the intensities of the light measured by the plurality of first light detecting sensors and the location of the plurality of first light detecting sensors in the cavity.

Advantageously, the control unit may determine the azimuthal position of the soiling on the glass dome.

Further particularly, the pyranometer may comprises at least one second light detecting sensor, wherein the second light detecting sensor is arranged such that a light exterior to the dome does not directly impinge on the second light detecting sensor, and wherein the second light detecting sensor is arranged so as to detect a light emitted from the light emitting source, reflected from the diffusor and impinging on the second light detecting sensors.

Further particularly, the control unit may be configured to compare the intensity of the light measured by the one or more first light detecting sensors and the intensity of the light measured by the second light detecting sensor, and modify the intensity of the light measured by the one or more first light detecting sensors if a difference between the intensity of the light measured by the one or more first light detecting sensors and the intensity of the light measured by the second light detecting sensor is detected by the control unit.

Advantageously, at least one second light second light detecting sensor arranged such that alight exterior to the dome does not directly impinge on the second light detecting sensor also is protected against any incoming UV radiation. Advantageously, the aging of this second light detecting sensor is reduced or prevented, that is this second light detecting sensor substantially does not age as the sensors located underneath the glass dome. Consequently, the measurement accuracy of this second light detecting sensor will not degrade or degrade less as compared to the measurement accuracy of the light detecting sensors arranged in the cavity underneath the dome. In other words, the measurement accuracy of the second light detecting sensor substantially will not be affected by the aging caused by the UV radiation. Since the light emitted by the light emitting source is also detected by this second "not aging" light sensor, it is possible to compare the light measured by the first light detecting sensors (sensors located in the cavity underneath the dome), with the light intensity measured by the second light detecting sensor (sensor that is not directly impinged by the light exterior to the pyranometer). Accordingly, the light intensity measured by the first light detecting sensors may be corrected if the latter age over the time. Accordingly, the soiling on the glass dome of the pyranometer can be qualified, or even quantified, with high accuracy. Additionally, the second light detecting sensor can measure the intensity of the light emitted by the light emitting source, trend it, and correct for degradation over time. Particularly, at a given power input to the light emitting source, the output may decrease over time. Advantageously, this effect could be corrected.

Further particularly, the at least one light emitting source is configured to emit a light flash or light impulse, and wherein the control unit is configured to compare a light flash or impulse Intensity measured by the first light detecting sensor and the light flash intensity measured by the solar radiation sensor. Particularly, this measurement may be performed during nighttime when there is any, or very little, solar radiation impinging on the pyranometer.

According to another aspect, there is provided a method of detecting a soiling on a dome in a pyranometer, the pyranometer comprising:

emitting a light substantially directed to a portion of a diffusor by at least one light emitting source, wherein the at least one light emitting source is arranged in the pyranometer such that a light exterior to a dome of the pyranometer does not directly impinge on the at least one light emitting source; and measuring an intensity of the light diffused by the diffusor and reflected from the dome by one or more first light detecting sensors arranged in a cavity enclosed by the dome of the pyranometer.

Particularly, the method may further comprise.

comparing the intensity of the light measured by the first light detecting sensor(s) with a respective pre-set light intensity value; and emitting or generating a soiling presence signal if the intensity of the light measured by the first light detecting sensor(s) differs from the pre-set light intensity value(s) particularly by a specified threshold and/or factor.

Particularly, the pyranometer may comprise a plurality of first light detecting sensors, wherein the method may further comprise:

comparing the intensities of the light measured by each of the plurality of first light detecting sensors; and emitting or generating a first signal if a difference in the intensities of the light measured by each of the plurality of first light detecting sensors is detected, and/or emitting or generating a second signal if a difference in the intensities of the light measured by each of the plurality of first light detecting sensors (6a) Is not detected, wherein the second signal being different from the first signal.

Further particularly, when a difference in the intensities of the light measured by the plurality of first light detecting sensors is detected, the method may further comprise determining an azimuthal angle of a point on the dome corresponding to a soiling accumulation, wherein the azimuthal angle is determined on the difference between the intensities of the light measured by each of the plurality of first light detecting sensors and the location of the plurality of first light detecting sensors in the chamber.

Further particularly, the method may further comprise:

emitting a light substantially directed to a portion of the diffusor; and measuring an intensity of the light reflected from the portion of the diffusor by a second light detecting sensor arranged such that a light exterior to the dome does not directly impinge on the second light detecting sensor;

particularly further comprising:

comparing the intensity of the light measured by the one or more first light detecting sensors and the intensity of the light measured by the second light detecting sensor; and modifying the intensity of the light measured by the one or more first light detecting sensors if a difference between the intensity of the light measured by the first light detecting sensor and the intensity of the light measured by the second light detecting sensor is detected.

These and other objects, features and advantages of the present invention will become more apparent upon a reading of the following detailed description and accompanying drawings. It should be understood that even though embodiments are separately described, single features thereof may be combined to additional embodiments.

With reference to the above figures, the pyranometer according to the present disclosure is indicated in its entirety with the reference number 100. The pyranometer 100 comprises a dome 1. The dome 1 of the pyranometer 100 may be an outer dome of the pyranometer 100. In other words, when mounted on the pyranometer 100, the dome 1 may form the outermost dome 1 of the pyranometer 100. If the dome 1 is an outer transparent dome 1 mounted on the pyranometer 100, an outer surface 11 of the dome 1 substantially faces an environment 13 external to the pyranometer 100, while an inner surface 12 of the dome 1 substantially encloses a cavity 10. Thus, the inner surface 12 of the dome 1 substantially faces the cavity 10. The cavity 10 substantially corresponds to the space underneath the inner surface 12 of the dome 1. Particularly, the cavity 10 has a shape that is substantially complementary to the shape of the inner surface 12 of the dome 1 that encloses the cavity 10. Preferably, the cavity 10 may have a substantially hemispherical shape and includes a bottom opening 14 having a substantially circular shape. The dome 1 may comprise an edge 15. The edge 15 may be a perimetric edge substantially forming the rim of the dome 1. The edge 15 may have preferably a substantially annular shaped surface. More particularly, a difference between the external radius, that is the radius of the outer surface 11, and the internal radius, that is the radius of the inner surface 12, substantially corresponds the thickness of the dome 1.

The dome 1 is at least partially transparent to the solar radiation. Particularly, the dome 1 is configured to limit the spectral response from about 190 to about 4000 nanometers (nm), preferably from about 300 to about 2800 nanometers (nm), while particularly substantially preserving the 180° field of view. The transparency of the dome 1 may be particularly such that at least about 80%, more particularly at least about 70% of the incident light in the relevant spectral range may pass therethrough.

In other words, the dome 1 is configured to allow at least a portion of the solar radiation spectrum (the solar light) to be transmitted from the environment 13 external to the pyranometer 100, through the outer surface 11, through the material forming the dome 1 and through the inner surface 12, in the cavity 10. In the cavity 10 of the pyranometer 100, the solar radiation can be measured as will be described in more details hereafter.

Accordingly, the dome 1 may be made of any suitable at least partially transparent material that allows the transmission of a solar radiation therethrough. Particularly, the dome 1 may be made of any material having such physical/chemical characteristics so as to protect the measurement surface of the pyranometer 100 yet at the same time being transparent to (most) of the light (at least partially transparent for a spectrum of solar radiation the pyranometer 100 is intended to detect). For example, the dome 1 may be made of glass. Alternatively, the dome 1 may be made of a transparent thermoplastic polymeric material, i.e. poly(methyl methacrylate) (PMMA) also known as acrylic, acrylic glass, or plexiglass.

Referring to FIGS. 1 to 4, the pyranometer 100 comprises a pyranometer housing 2. The pyranometer housing 2 may be or may comprise a container configured to contain the components of the pyranometer 100, e.g. a solar radiation sensor 7, a controller and/or a control unit 8 that will be hereafter described in more details. The pyranometer housing 2 may be provided with one or more levelling feet 21 for supporting the pyranometer housing 2 e.g. on a ground surface S.

The pyranometer housing 2 comprises a chamber 20. The chamber 20 may be particularly configured to contain at least the following components of the pyranometer 100: a solar radiation sensor 7, a diffusor 4, at least one light emitting source 5, and one or more second light detecting sensors 8b. Particularly, the chamber 20 comprises a bottom surface 200 on which the solar radiation sensor 7, the at least one light emitting source 5 and particularly one or more second light detecting sensors 8b may be located. In other words, the solar radiation sensor 7, the at least one light emitting source 5 and/or the one or more second light detecting sensor 6b may be arranged to directly, or indirectly, contact the bottom surface 200 of the chamber 20.

Specifically, the solar radiation sensor 7, the at least one light emitting source 5 and/or the one or more second light detecting sensor 6b may be removably, or permanently, connected to the bottom surface 200 of the chamber 20.

The bottom surface 200 may be planar and/or may have a substantially circular shape. The chamber 20 also comprises an opening 201 that is located opposite to the bottom surface 200. The opening 201 may have a substantially circular shape as the bottom surface 200 of the chamber 20.

With reference to FIGS. 1 to 4, the at least one light emitting source 5 of the pyranometer 100 is arranged such that a light exterior to the dome 1, i.e. the solar radiation, substantially does not directly impinge on the at least one light emitting source 5. In other words, the light emitting source 5 is arranged on the pyranometer 100 so as to be substantially shaded, that is not directly hit by the solar radiation.

Figure 2:
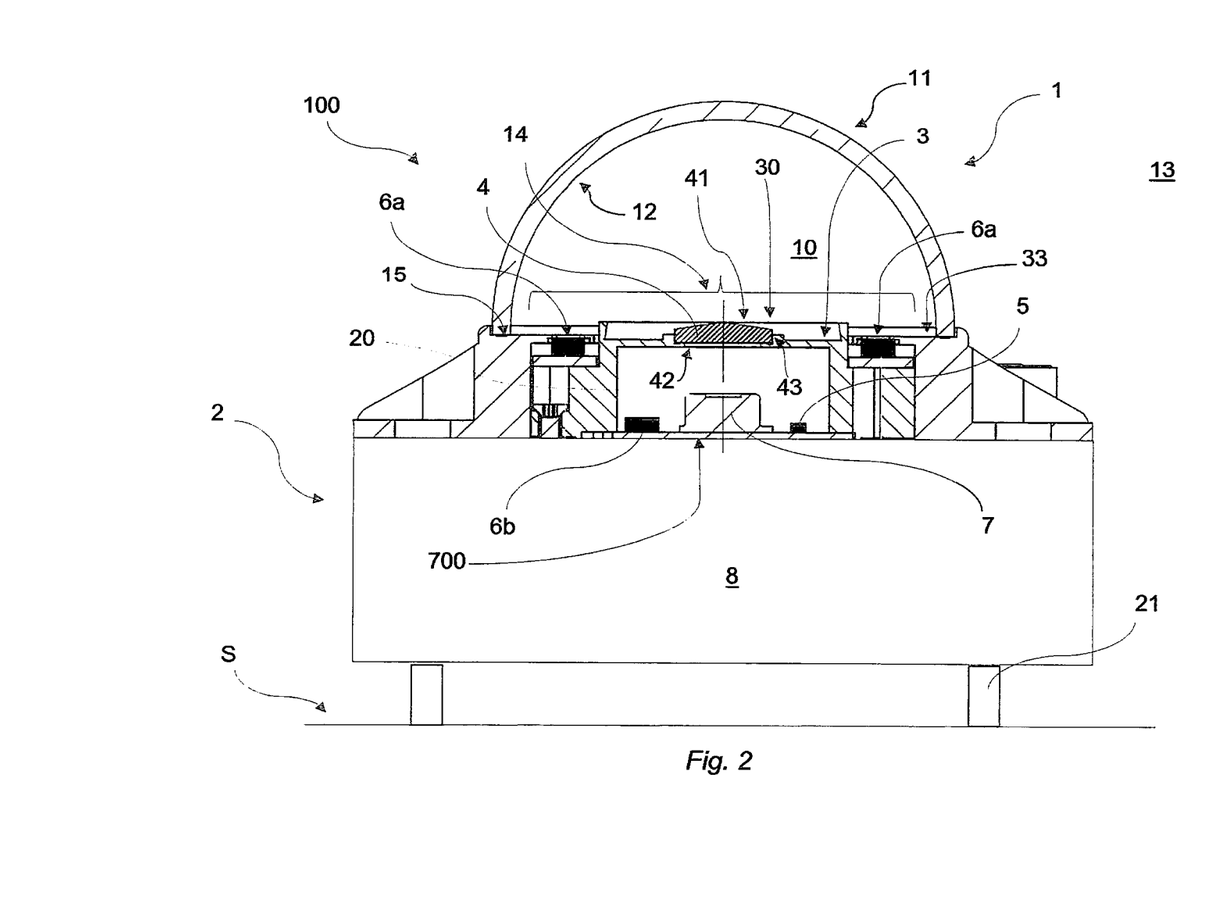
FIG. 2, is a lateral cross-sectional view of the pyranometer according to the present disclosure.
Figure 3:
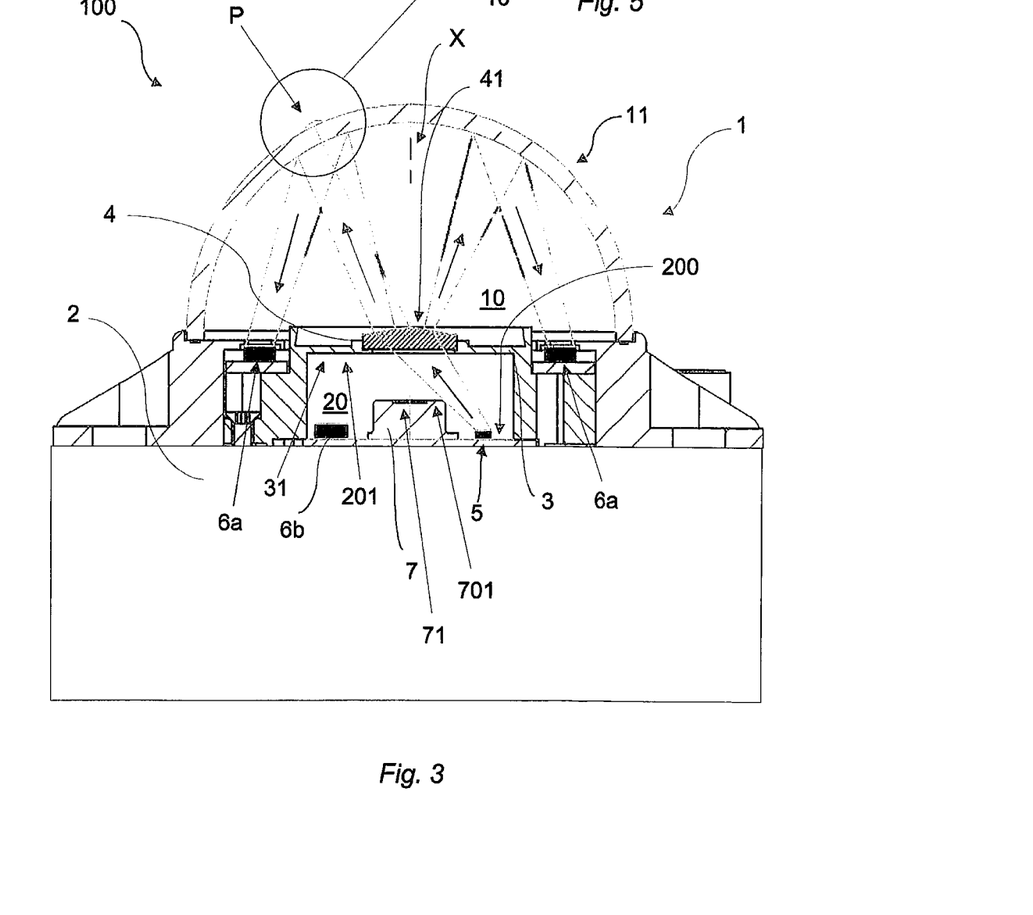
FIG. 3, is a lateral cross-sectional view of the pyranometer according to the present disclosure.
Figure 4:
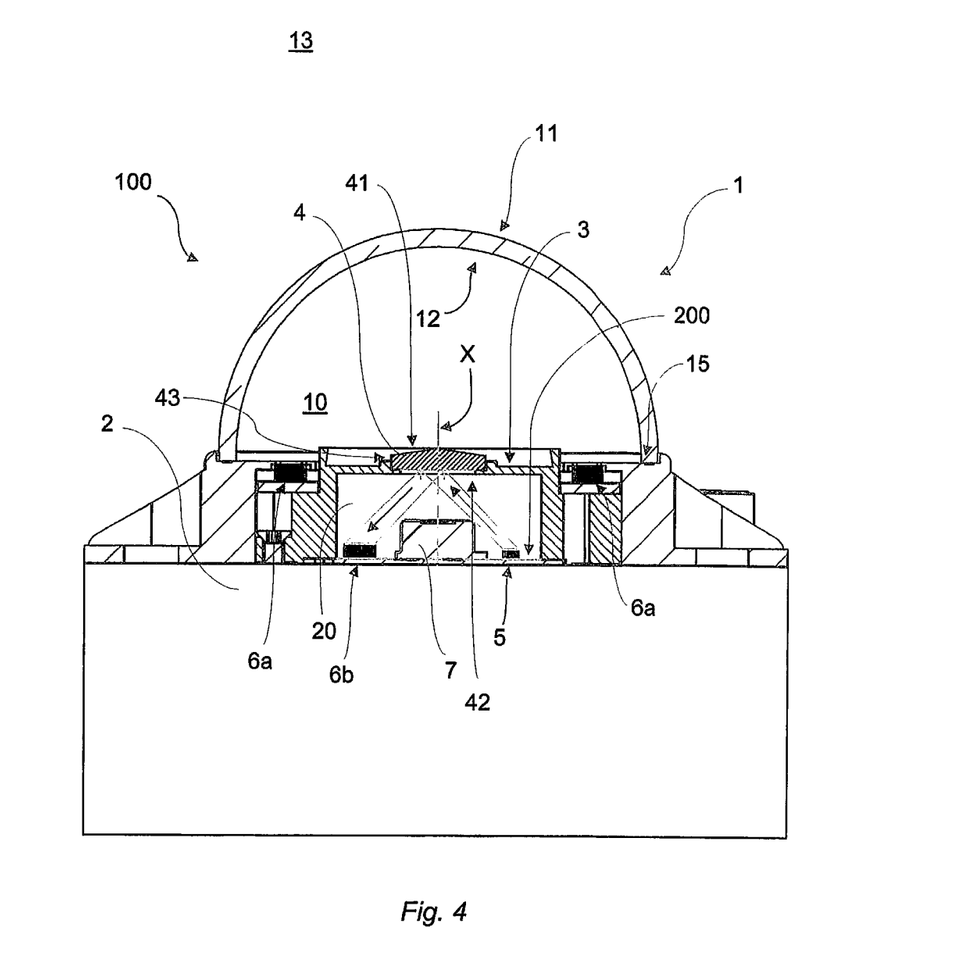
FIG. 4, is a later cross-section view of the pyranometer according to the present disclosure.

As shown in FIGS. 2 to 4, the at least one light emitting source 5 may be located in the chamber 20 of the pyranometer housing 2. More particularly, the at least one light emitting source 5 may be located underneath a partition wall 3 that is arranged to at least partially partition the chamber 20 from the cavity 10. As a consequence of this arrangement, the light exterior to the dome 1 may not directly impinge on the least one light emitting source 5. As above described, the at least one light emitting source 5 may be located to directly, or indirectly, contact the bottom surface 200 of the chamber 20. The light emitting source 5 may be located eccentrically with respect to a center of the chamber 20.

The at least one light emitting source 5 may be configured to emit light substantially directed to a portion of a diffusor 4. As shown in FIGS. 3 to 4, the at least one light emitting source 5 and the diffusor 4 may be arranged such that the light emitted from the light emitting source 5 may be directed to at least a portion of a lateral surface and/or bottom surface of the diffusor 4 substantially facing the chamber 20. The light emitted by the at least one light emitting source 5 particularly may be configured as a light beam, i.e. a collimated light beam.

Specifically, the at least one light emitting source 5 may be configured to emit a light whose propagation direction is substantially inclined with respect to bottom surface 200 of the chamber 20. In other words, the propagation direction of the light emitted from the at least one light emitting source 5 and the bottom surface 200 of the chamber may form an angle that is lower than about 90°, preferably lower than about 75°. Accordingly, the propagation direction of the light emitted from the at least one light emitting source 5 and an axial direction of the diffusor 4 form an angle that is lower than about 90°, preferably lower than about 75°.

The at least one light emitting source 5 may be or comprise alight emitting diode (LED). Particularly, the LED may be configured to emit a blue light. Preferably, the light emitted from the LED may have a spectrum peak between about 400 nm and about 500 nm. Alternatively, the at least one light emitting source 5 may be or comprise a laser, a laser diode in particular, incandescent or fluorescent light sources, other, or any combination thereof.

The at least one light emitting source 5 may be configured to emit a light flash or impulse, that is emitting alight for a predetermined relatively short time duration. For example, the light emitting source 5 may be configured to emit a light flash for a time duration particularly lower than about 2 s, further particularly lower than about 1 s, even further particularly lower than about 10 ms.

Additionally, the at least one emitting source 5 may be configured to emit a light whose intensity is substantially greater than the intensity of the (solar) light external to the pyranometer 100. Advantageously, by emitting a light flash (particularly having a relatively short time duration), and whose intensity 1a substantially greater that the solar light intensity particularly at the time of measurement, it Is possible to clearly distinguish the light emitted from the at least one light emitting source 5 from the background solar light that is also simultaneously measured by the first light detecting sensors 6a arranged in the cavity 10. In other words, a control unit 8 that processes the light measured by the first light detecting sensors 6a, can be configured to distinguish the light emitted by light emitting source 5 having certain characteristics (time and intensity) from the background solar light.

With reference to FIGS. 1 to 4, the pyranometer 100 comprises a diffusor 4. The diffusor 4 is an optical element that has an incident first or top surface 41 substantially facing the cavity 10, an substantially opposite second or bottom surface 42 thereof substantially facing the chamber 20, and/or at least one side surface 43. The incident surface 41 specifically may be a flat circularly shaped surface, a conically shaped surface, a convex surface, a concave surface, or an inverted conical surface. Particularly, the diffusor 4 may be axisymmetric, that is symmetric about a longitudinal axis X of the diffusor 4. In other words, the diffusor 4 may be a rotationally symmetric body having a longitudinal axis X. For example, the diffusor 4 may have a substantially cylindrically shaped side surface 43 and/or comprising a conically shaped first or top surface 41.

As shown in FIGS. 2 to 4, the diffusor 4 may be arranged such that the bottom surface 42 substantially faces a receiving surface 71 of the solar radiation sensor 7 whereas the incident top surface 41 substantially faces towards the inner surface 12 of the dome 1. Accordingly, the light external to the dome 1 entering the cavity 10 and impinging the diffusor 4 at least partly can be transmitted through the diffusor 4 towards the chamber 20 so as to be incident on the receiving surface 71 of the solar radiation sensor 7.

The diffusor 4 may comprise or be made of any material that allows a light incident thereon to be diffused and transmitted through the diffusor 4. For example, the diffusor 4 may comprise, or be made, of at least partially porous material, such as bubble quartz.

As shown in FIGS. 2 to 4, the diffusor 4 is configured to diffuse the light emitted from the at least one light emitting source 5 towards the inner surface 12 of the dome 1. In other words, the light emitted from the at least one light emitting source 5 is directed to a portion of the diffusor 4, e.g. the bottom surface 42 and/or the side surface 43, so as to impinge the diffusor 4. Due to the optical characteristics of the diffusor 4, the light impinging the diffusor 4 is transmitted through the same diffusor 4 and diffused (particularly substantially uniformly) towards the inner surface 12 of the dome 1.

Figure 5:
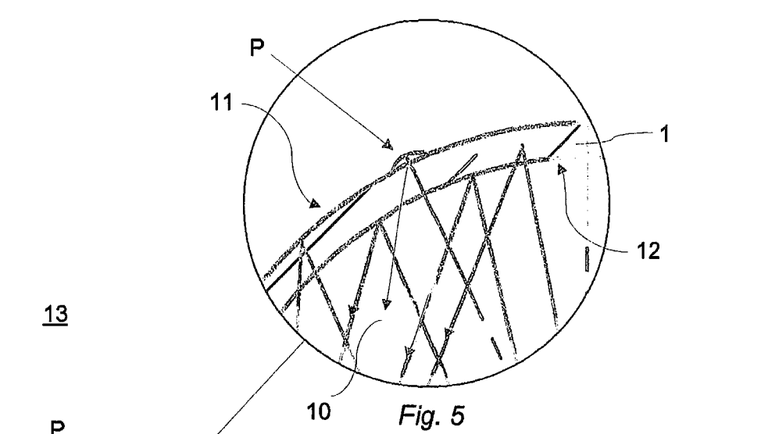
FIG. 5, is a detailed view of a dome portion of the pyranometer illustrated in FIG. 3.

Particularly, as shown in FIG. 5, the light diffused by the diffusor 41s reflected by the soiling. i.e. soiling particles P, covering or deposited on the outer surface 11 of the dome 1. The light diffused by the diffusor 4 may be also at least partially reflected by the inner surface 12 of the dome 1 and/or by the material of the dome 1 and/or by the outer surface 11 of the dome 1. The light reflected by the dome 1 and by the soiling particles P at least partly is particularly directed toward the light detecting sensor(s) 6a where the intensity of the light can be detected by the same light detecting sensor(s) 6a.

As shown in FIGS. 1 to 4, the pyranometer 100 comprises one or more first light detecting sensors 6a. The one or more first light detecting sensors 6a is arranged in the cavity 10, that is underneath the dome 1. Particularly, the one or more first light detecting sensors 8a may be arranged on a first upper surface 32 of a partition wall 3 that will be described in more detail hereinafter. The one or more first light detecting sensors 6a may be arranged eccentrically to a center of the diffusor 4.

The one or more first light detecting sensors 6a are configured to measure an intensity of the light reflected from the soiling particles P and/or from the dome 1 and impinging on the one or more first light detecting sensors 6a arranged in the cavity 10. The light reflected from the dome 1 and/or from the soiling particles P is emitted from the at least one light emitting source 5 and it is diffused by the diffusor 4. Accordingly, the one or more first light detecting sensors 6a and the at least one light emitting source 6 are arranged such that the light emitted from the at least one light emitting source 5, diffused by the diffusor 4 and reflected by the dome 1 and/or from the soiling particles P, does not directly reach the one or more first light detecting sensor 6a. In other words, the light emitted by the light emitting source 5 propagates along a predefined path, i.e. the diffusor 4 and the dome 1, so as to be reflected by the soling particles P and/or the dome 1 before impinging the first light detecting sensors 6a. Accordingly, a portion of the light scattered by any soiling particle P, either solid or liquid, present on the outer surface 11 of the dome 1 may be received and detected by any one of the one or more first light detecting sensors 6a.

The one or more first light detecting sensors 6a may be or comprise at least one photosensor (such as a transistor) arranged to detect light impinging thereon and for generating a signal whose value relates to an amount of light received, i.e. the light impinging the one or more first light detecting sensors ea. The one or more first light detecting sensor 6a may be at least sensitive to a spectrum emitted by the at least one light-emitting source 5. The light detecting sensor 6a may be a photodiode.

Figure 1:
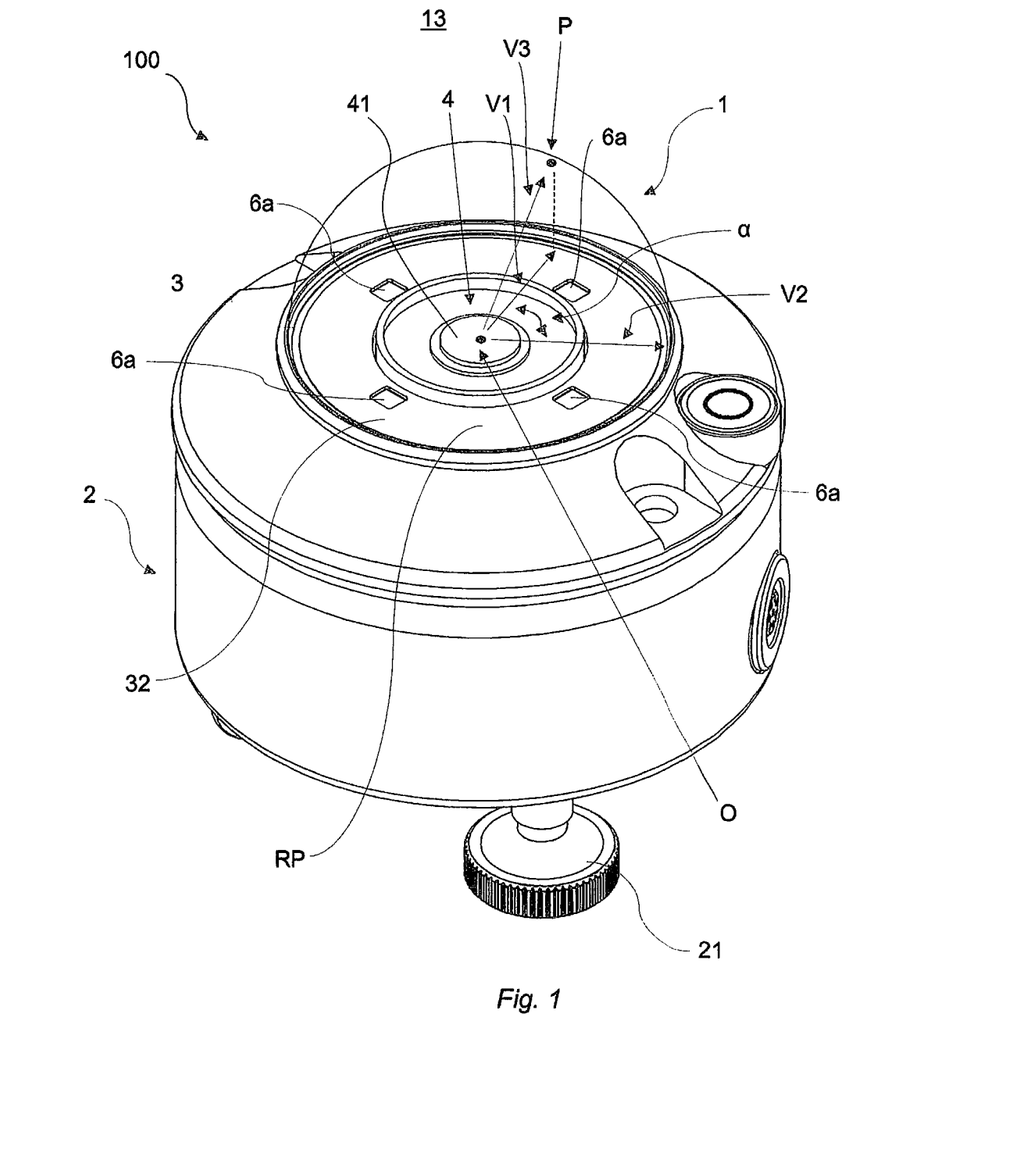
FIG. 1, is an axonometric view of a pyranometer according to the present disclosure.

In one aspect, the pyranometer 100 may comprise a plurality of first light detecting sensors 6a. For example, as shown in FIG. 1, the pyranometer 100 may comprise four first light detecting sensors 6a, wherein each couple of the four first light detecting sensors 6a may form an angle of substantially 90°.

The plurality of first light detecting sensors 6a may be arranged in the cavity 10. Particularly, the plurality of first light detecting sensor 6a substantially are arranged symmetrically around the diffusor 4 and/or with respect to the dome 1. More particularly, each of the plurality of first light detecting sensors 6a substantially may be arranged equidistantly from the diffusor 4 and/or to substantially have the same angular or azimuthal spacing therebetween. More particularly, the plurality of first light detecting sensor 6a may be are arranged substantially symmetrically around the longitudinal axis X of the diffusor 4.

With reference to FIGS. 1 to 4, the pyranometer 100 may comprise at least one partition wall 3. The partition wall 3 may be arranged to at least partially partition the chamber 20 of the pyranometer housing 2, from the cavity 10 enclosed by the dome 1. Accordingly, if the at least one light emitting source 5 is located in the chamber 20, a light exterior to the dome 1 cannot directly impinge on the at least one light emitting source 5 due to the partition wall 3 that partitions the cavity 10 from the chamber 20.

The partition wall 3 may comprise at least one through opening 30 in which the diffusor 4 may be arranged. In other words, the diffusor 4 may be located or arranged in the through opening 30 of the partition wall 3.

The through opening 30 may be centrally located with respect to the outer perimetral edge 33 of the partition wall 3 and/or the dome 1. In other words, a center point of the opening 30 may be equidistant to the perimetral edge 33 of the partition wall 3 and/or the edge 15 of the dome 1.

The through opening 30 may have a surface extension that corresponds to, or is larger than, a surface extension or diameter of the diffusor 4. Particularly, if the through opening 30 has a circular shape, the diameter of the through opening 30 substantially corresponds to, or is larger than, an outer diameter of the diffusor 4.

The partition wall 3 may be non-transparent to the light. In other words, the partition wall 3 may be an element that is opaque to the light, i.e. the partition wall 3 does not allow the light to pass through. The partition wall 3 may be made of, or comprise, a material that substantially is opaque to the light, particularly to UV. For example, the partition wall 3 may be made of, or comprise, a metallic material whose surface is substantially opaque to the light.

Specifically, as shown in FIGS. 2 and 3, when the dome 1 is mounted on the pyranometer housing 2, the bottom opening 14 of the dome 1 may substantially match the opening 201 of the chamber 20. As a result, the chamber 20 and the cavity 10 are in communication with each other.

Due to the arrangement of the partition wall 3, the chamber 20 and the cavity 10 at least partly are partitioned, i.e. they are separated from each other by the partition wall 3 interposed therebetween. Particularly, the partition wall 3 may be located at the interface between the cavity 10 and the chamber 20, so as to partition the cavity 10 from the chamber 20. Accordingly, the partition wall 3 at least partially closes the chamber 20. In other words, the opening 201 of the chamber 20 is closed by the partition wall 3 as illustrated in FIG. 3.

The partition wall 3 comprises a first (upper) surface 32 facing the cavity 10, and a second (bottom) surface 31 facing the chamber 20, and opposite to the first (upper) surface 32. The partition wall 3 may have a shape substantially correspondent to the shape of bottom opening 14 and to the shape of the opening 201 of the chamber 20. For example, the partition wall 3 may have a circular shape or disk-shaped.

As shown in FIGS. 1 to 4, the pyranometer 100 comprises a solar radiation sensor 7. The solar radiation sensor 7 is a measuring sensor configured to measure the solar radiation impinging the pyranometer 100. The solar radiation sensor 7 may be or comprise at least one photodiode, and/or at least one thermopile-based sensor which is a sensor based on thermopiles particularly suitable to measure the broad band of the solar radiation flux density specifically from a substantially 180° field of view angle. A thermopile specifically is an electronic device that converts thermal energy into electrical energy and comprises several thermocouples connected in series or in parallel. The thermopile works on the principle of the thermoelectric effect of generating a voltage when its dissimilar metals or thermocouples are exposed to a temperature difference. Thermocouples operate by measuring the temperature differential from their junction point to the point in which the thermocouple output voltage is measured. Once a closed circuit is made up of more than one metal and there is a difference in temperature between junctions and points of transition from one metal to another, a current is produced as if generated by a difference of potential between the junctions being at different temperatures.

In other words, the pyranometer 100 of the present disclosure particularly is a thermopile pyranometer (also referred to as thermo-electric pyranometer). Advantageously, the thermopile pyranometer 100 particularly detects light of about 300 to about 2800 nm with a largely flat spectral sensitivity.

Specifically, the thermopile sensor comprises a black coating which absorbs (particularly all) solar radiation. The active (hot) junctions of the thermocouples are located beneath (or in correspondence with or adjacent to) the black coating surface and are heated by the radiation absorbed from the black coating. The passive (cold) junctions of the thermocouples are (particularly fully) protected from solar radiation and in thermal contact with the pyranometer housing 2, which particularly serves as a heat-sink. This advantageously reduces or prevents any alteration from yellowing or decay when measuring the temperature in the shade, thus impairing the measure of the solar irradiance by the pyranometer 100.

The solar radiation sensor 7 comprises a first (bottom) surface 700 that directly, or indirectly, contacts the bottom surface 200 of the chamber 20 of the pyranometer housing 2. The solar radiation sensor 7 comprises a second (upper) surface 701 substantially opposite to the first (bottom) surface 700. The second (upper) surface 701 may face the diffusor 4. Particularly, the solar radiation sensor 7 and the diffusor 4 may be stacked one on top of the other such that the diffusor 4 is arranged to be substantially located in the through opening 30 of the partition wall 3. Due to this "stacked" arrangement, the external light passing through the dome 1, reaches the cavity 10 at different incident angles. The external light can be then gathered by the diffusor 4 and directed to the second (upper) surface 701 of the solar radiation sensor 7, particularly in a substantially collimated way.

As shown in FIG. 2, the pyranometer 100 may comprise at least one control unit 8. The control unit 8 may be operatively connected to the at least one light emitting source 5, to the one or more first light detecting sensors 6a, to the at least one second light detecting sensors 6b and/or to the solar radiation sensor 7. The control unit 8 may be a controller, preferably a micro controller.

The control unit 8 may be configured to control the operation of the light-emitting source 5 and/or of each one of the first light detecting sensors 6a and/or of the second light detecting sensors 6b. The control unit 8 may be also configured to receive and process the signals provided by each of the plurality of first light detecting sensors 6a arranged in the cavity 10 and/or the signals provided by each of the at least one second light detecting sensors 6b. The signals received by the control unit 8 and provided by the first, or second, light detecting sensors may correspond to the light intensity measured by each of the light detecting sensors.

The control unit 8 may include noise reduction, digitalization, compression, amplification, filtering, other, or a combination thereof.

According to an aspect, the control unit 8 may be configured to compare the intensity of the light measured by at least one of, particularly by each of the one or more first light detecting sensors 6a with a respective pro-set light intensity value. Particularly, the at least one light emitting source 5 may be configured to emit a light flash or pulse that may be measured by the first light detecting sensors 6a. The pre-set light intensity value may correspond to the light intensity measured by at least one of, particularly by each of the one or more first light detecting sensors 6a, when no soiling is present on the dome 1 (cleaned dome condition or 0% soiling rate). The pre-set light intensity value may be determined by measuring the light intensity by the first light detecting sensor(s) 6a in condition of a cleaned dome, that is no soiling present on the dome 1. Particularly, the pre-set light intensity value may be a factory calibrated light intensity value. Since the light intensity measured by the first light detecting sensors 6a, in cleaned dome condition (0% soiling rate), may also vary between the first light detecting sensors 6a, each first light detecting sensor 6a may have a respective different pre-set normalized light intensity value. For example, the light intensity measured by the first light detecting sensor(s) may be expressed as a percentage. Further particularly, for each first light detecting sensor 6a, the respective pre-set light intensity value may be also determined as a historical value. In summary, a respective pre-set light intensity value for each first light detecting sensors 6a may be determined in a cleaned dome condition.

The control unit 8 may be further configured to determine whether the intensity of the light measured by the first light detecting sensor(s) 6a differs from the respective pre-set light intensity value. In other words, the control unit 8 may be configured to independently compare each light intensity measured by the first light detecting sensor(s) 6a with the respective pre-set light intensity value, that is a respective pre-set light intensity value of each of the light detecting sensors. Accordingly, a different light intensity can be detected by the control unit 8, for example when the light intensity measured by one (or more) of the first light detecting sensors 6a Is different from the respective pre-set light intensity value. It should be understood that the pre-set light intensity value may vary among the different first light detecting sensors 6a of the plural first light detecting sensors 6a. Particularly, the control unit 8 may detect is the measured light intensity differs from the respective pre-set light intensity value by a specified pre-set threshold and/or factor. The thresholds and/or the factor may be determined or determinable.

Accordingly, if one or more of the light intensities measured by the first light detecting sensors differs from the respective pre-set value, the control unit 8 may emit a soiling presence signal. That is, if at least one light intensity measured by the first light detecting sensor(s) 6a is different from the respective pre-set light intensity value, particularly by a specific threshold and/or factor, the control unit 8 determines that the dome 1 is at least partially covered by soiling (the soiling particles cause a variation in the light intensity measured by the first light detecting sensors 6a). Thus, the control unit 8 is configured to emit a (general) signal of soiling presence (signal indicating the soiling presence) so as to inform a user about the soiling presence on the dome 1. On the other hand, if the intensity of the light measured by the first light detecting sensor(s) 8a substantially corresponds, particularly within a specified (pre-set or pre-settable) threshold and/or factor, to the respective pre-set light intensity value, the control unit 8 determines that no soling is present on the dome 1, that is the dome 1 is clean.

According to an aspect, the pyranometer 100 may comprise a plurality of first light detecting sensors 6a. The control unit 8 may be further configured to determine the soiling spatial distribution on the dome 1. Particularly, the control unit 8 may be further configured to compare the intensities of the light measured by each of the plurality first light detecting sensors 6a. Particularly, this comparison can be performed if at least one, more than one, or all of the light intensities measured by the first light detecting sensors 6a differs from the respective pre-set light intensity value by a specified threshold and/or factor (a certain amount of soiling is present on the dome).

According to this aspect, the light intensities measured by the each one of the first light detecting sensors 6a are compared to each other by the control unit 8. Particularly, the control unit 8 may be configured to determine if a difference in the intensities of the light measured by each of the plurality of first light detecting sensors 6a is present (the first light detecting sensors 6a measure different light intensities). Particularly, the intensities of the light measured by each of the plurality of first light detecting sensors 6a may be different with respect to a normalized value. That is, if at least one of the first light detecting sensor 6a measures a different light intensity with respect to the light intensities measured by the other first light detecting sensors 6a, the control unit 8 determines that a difference in the intensities of the light measured by each of the plurality of first light detecting sensors 6a is present. As a result, the control unit 8 determines that the soiling is present on the dome 1, and the soiling is also asymmetrically distributed on the dome 1. Accordingly, the control unit 8 may be configured to emit a first signal. The first signal may correspond to a signal of "uneven soiling rate", or a signal of "soiling presence on the outer surface 11 of the dome 1". In other words, if the light intensity measured by each of the plurality of first light-detecting sensors 6a arranged in the chamber 10 vary among the plurality of first light-detecting sensors 6a, that is at least one sensor 6a measures a different light intensity, the control unit 8 determines that an amount of soiling is present on the outer surface 11 of the dome 1, and the soiling amount is asymmetrically distributed over the dome 1. That is, the control unit 8 determines that an uneven soiling amount is present on the outer surface 11 of the dome 1.

Accordingly, the first signal may inform the user that the dome 1 is covered by an asymmetrically distributed soiling so that the user may take appropriate action such as triggering or performing cleaning of the pyranometer 100 or its dome 1. For example, the control unit 8 may be operatively connected with a remote unit, e.g. a personal computer or a smartphone, such that the first signal may be received by the user.

Further particularly, if a difference in the intensities of the light measured by the plurality of first light detecting sensors 8a Is detected by the control unit 8, the control unit 8 may be configured to determine an azimuthal angle of a point P on the dome 1. This point may correspond to a particular soiling accumulation area, i.e. soiling particles P.

As shown in FIG. 1, the azimuthal angle "a" may correspond to the angle comprised between a first vector V1 and a second vector V2. As shown in FIG. 1, the vector V1 corresponds to the perpendicular projection of the vector V3 between an observer (origin) point O, i.e. the center of the cavity 10, to the point of soiling accumulation P onto a reference plane "RP". The vector V2 Is a reference (fixed) vector V2 lying on the same reference plane RP. The reference plane RP may correspond to a plane containing the first light detecting sensors 6a and/or the diffusor 4.

Specifically, the azimuthal angle "o" may be determined by the control unit 8, based on the difference between the Intensities of the light measured by each of the plurality of first light detecting sensors 6a, i.e. detecting the light intensity variation, and the location of the plurality of first light detecting sensors 6a In the cavity 10. In other words, based on the differences between the light intensity measured by the different first light detecting sensors 6a and/or the location of each of the first light detecting sensors 6a in the cavity 10, the control unit 8 may be configured to determine the azimuthal angle of the soiling particles P on the outer surface 11 of the dome 1. For example, the control unit 8 may be configured to perform a triangulation process in order to (particularly unambiguously) determine the position of the point P on the dome 1, and particularly its azimuthal angle "α" Particularly, the azimuthal angle α can be determined by comparing the intensities of the light measured by each of the first plurality of light detecting sensors 6a. If a spot of soiling is above one of (or in correspondence to) the first light detecting sensor 6a, the latter will measure a light intensity substantially different from the light intensity measured by the other first light detecting sensors 6a.

Thus, if the control unit 8 determines that the light Intensity measured by one of the first light detecting sensors 6*a* substantially differs from the light intensity measured by the other first light detecting sensor(s) 6*a*, based on the location of this light detecting sensor 6*a*, the control unit 8 may be configured to determine the azimuthal angle α of a certain point P, or area on the dome 1, wherein a particular amount of soiling is present, by implementing, for example, a triangulation process.

Advantageously, comparing the light intensity measured by each of the light detecting sensors 6*a* and, eventually, detecting if a difference is present between sensors ea, it Is possible to correctly quantify the soiling amount. Particularly, if a difference Is present between the light intensities measured by each of the light detecting sensors 8*a*, an uneven soiling rate is determined, that is the control unit 8 emits or generates a corresponding signal (e.g. that informs the user) about the actual soiling rate on the dome 1.

According to an aspect, if a difference in the intensity intensities of the light measured by each of the plurality of first light detecting sensors 6*a* Is not detected by the control unit 8, the control unit 8 may be configured to emit a second signal, wherein the second signal is different from the first signal. That is, if each of the plurality of first light detecting sensors 8*a* measures substantially the same or corresponding light intensity amount, and this light intensity is different from the pre-set light intensity value, the control unit 8 determines that the soiling is substantially evenly covering the dome 1. In other words, the soiling substantially is symmetrically covering on the dome 1.

Specifically, the control unit 8 may be further configured to generate a second signal that is different from the first signal. Particularly, the second signal may correspond to a null/minimal soiling rate signal, or to a substantially symmetrical soiling signal. The second signal may inform the user that the dome 1 is covered by soiling. Particularly, the second signal may be indicative of a non-uniform soiling (distribution) covering the dome 1. For example, the control unit 8 may be operatively connected with a remote unit, e.g. a personal computer or a smartphone, such that the second signal may be received by the user, informing the latter about the actual soiling rate.

Advantageously, if substantially no difference is present between the light intensities measured by the light detecting sensors 8*a* and if the measured light intensity is also equal to the pre-set light intensity value a 0% soiling rate is determined. Alternatively, if the light intensity is also different from the pre-set light intensity value a substantially symmetrical/even soiling is determined. Accordingly the control unit 8 is configured to emit a correspondent signal that may Inform the user about the actual soiling rate of the dome 1.

As above described, the control unit 8 may be configured to determine and/or compare the light Intensity measured by each of the first light-detecting sensors 6*a*. For example, if the plurality of first light-detecting sensors 6*a* comprises four light-detecting sensors, the control unit 8 is configured to compare the light intensity, that is the amount of light, measured by each light detecting sensors 6*a*. Particularly, at a given light intensity of the light-emission source, the response of the light-detecting sensors 6*a* may be directly related to the amount of soiling present on the outer surface 11 of the dome 1.

As shown in FIGS. 2 to 4, the pyranometer 100 may comprise at least one second light detecting sensor 6*b*.

The second light detecting sensor 8*b* may be arranged such that a light exterior to the dome 1 does not directly Impinge on the second light detecting sensor 6*b*. Particularly, the second light detecting sensor 6*b* may be arranged in the chamber 20 of the pyranometer housing, preferably underneath the partition wall 3.

The second light detecting sensor 6*b* may be arranged so as to detect a light emitted from the light emitting source 5, reflected from the diffusor 4 and Impinging on the second light detecting sensors 6*b*.

In other words, the at least one light emitting source 5 may be configured to emit a light substantially directed to a portion of the diffusor 4, e.g. the bottom surface 42 of the diffusor 4. Due to the configuration of the diffusor 4, the light may be, at least partially reflected by the diffusor 4, so as to Impinge on the second light detecting sensor 6*b*.

The control unit 8 may be configured to compare the intensity of the light measured by the one or more first light detecting sensors 6*a*, that is the light detecting sensors arranged in the cavity 10, and the intensity of the light measured by the second light detecting sensor 6*b*, that Is the light detecting sensor 6*b* arranged in the chamber 20 and/or substantially shaded by the partition wall 3 from the exterior light.

The control unit 8 may be further configured to modify the intensity of the light measured by (or determined on the basis of) the one or more first light detecting sensors 6*a* if a difference between the intensity of the light measured by the one or more first light detecting sensors 6*a* and the intensity of the light measured by the second light detecting sensor 6*b* is detected.

Advantageously, the second light detecting sensor 6*b* Is arranged such that the light exterior to the dome 1 does not directly Impinge thereon. Thus, the second light detecting sensor Sb can be protected by the incoming UV radiation such that the aging of this second light detecting sensor 6*b* is prevented, or at least delayed, in comparison with the first light detecting sensor(s) 6*a* that does age due to the light impinging thereon.

Thus, the measurement accuracy of this second light detecting sensor 6*b* advantageously substantially will not degrade as the measurement accuracy of the light detecting sensors 6*a* arranged underneath the dome. In other words, the measurement accuracy of the second light detecting sensor 6*b* advantageously will be less affected or not be affected by the aging caused by the UV radiation.

Since the light emitted by the light emitting source 5 is also detected by this second "not/less aging" light sensor 6*b*, it is possible to compare the light measured by the first light detecting sensors 6*a* (sensors located in the cavity 10 underneath the dome 1), with the light intensity measured by the second light detecting sensor 6*b* (sensor that is not directly impinged by the light exterior to the pyranometer 100).

Specifically, the light Intensity measured by the first light detecting sensors Sa may be corrected or adjusted based on the light measurements of the second light sensor(s) 6*b*, specifically if the light detecting sensors 6*a* measure an Incorrect light intensity due to the aging.

For example, for a given light intensity output by the light emitting source 5, if the control unit 8 determines the light intensity measured by (one or more of) the first light detecting sensors 6*a* differs from or does not correspond to the light intensity measured by the second light detecting sensor(s) 6*b*, the control unit 8 may be configured to modify, i.e. correct, the light Intensity measured by the first light detecting sensors 6*a*. Accordingly, the soiling on the glass dome 1 of the pyranometer 100 can be determined (particularly qualified or quantified) with high accuracy specifically if the true or correct light Intensity is measured by the light detecting sensor(s) 6a.

As above described, in order to detect the presence of soiling on the outer surface of the dome 1, the control unit 8 may be configured to compare the intensity of the light measured by the one or more first light detecting sensors 6a with the respective pre-set light intensity value. The light measured by the one or more first light detecting sensors 6a is emitted by the at least one light emitting source 5. Particularly, the light emitting source 5 may emit the light flash. When monitoring the soiling presence, the control unit 8 may be further configured to compare the light (flash) intensity measured by the one or more first light detecting sensors 6a with the respective pro-set light Intensity value, and simultaneously with the light intensity measured by the second light detecting sensor 6b.

Advantageously, by simultaneously comparing the light intensity measured by the second light sensor 6b and by the one or more first fight detecting sensors 6a, the temperature dependency of the output of the light emitting source 5 can be taken into account. Specifically, due to the variation of light source 5 output with the temperature, the light measured by the light detectors may be also affected by a temperature variation, resulting in a not accurate light measurement. Thus, comparing the light measurements as above described particularly with a light detecting sensors that may not be affected by the same temperature variation, allows to correctly determine the light measured by the light detecting sensors, also taking into account (and eventually correcting) the potential light output variation with the temperature. Further particularly, the control unit 8 may be configured to correct the solar radiation measured by the solar radiation sensor 7. Particularly, if the control unit 8 determines that a certain amount of soiling Is present on the dome 1, as above described, the control unit 8 may be configured to correct the solar radiation measured by the solar radiation sensor 7 such that the reduction caused by the soiling in the solar radiation effectively measured by the sensor 7, is taken Into account.

Particularly, if the control unit 8 determines that the detected soiling rate results in a predetermined, or predeterminable, reduction of the measured solar radiation, the control unit 8 may be configured to correct the measured solar radiation by the solar radiation sensor 7, i.e. compensating the solar radiation reduction due to the soiling amount covering the outer surface of the dome 1.

Particularly, the aging of the light detecting sensors 6a over time may be monitored by configuring the light emitting source 5 to emit a light flash as above described (particularly having a specified duration and/or Intensity). Particularly, the control unit 8 may be configured to compare the light measured by first light detecting sensors 6a with the background light (radiation) also measurable by the solar radiation sensor 7. Particularly, due to the arrangement of the diffusor 4, at least a portion of the light emitted by the at least one light emitting source 5 is also reflected toward the solar radiation sensor 7 by the diffusor 4.

Consequently, the solar radiation sensor 7 may also measure the intensity of the light impinging on the same sensor 7 but emitted from the light emitting source 8. By comparing or determining these measured light intensities over the time, a reduction in the performances of the first light detecting sensors 6a due to the aging of the same sensors may be determined by the control unit 8.

While monitoring the aging of the light detecting sensors 6a, soiling may not be measured at the same time. Thus, a relatively short pulse to measure the soiling may be used. Additionally, a smart sampling regime Is used for the solar radiation sensor 7 such that the light flash is not taken Into account.

Further particularly, the frequency of the above described aging monitoring process may be configured by the user so as to have a minimal Influence on the irradiance measurement by the solar radiation sensor 7.

Advantageously, the control unit 8 may be also configured to perform a self-functionality check of the solar radiation sensor 7.

Particularly, the control unit 8 may be configured to compare the measurement of the solar radiation sensor 7 with the measurement of the first light detecting sensors 8a and/or the second light detecting sensor 4b, after a light flash. Accordingly, if no light is measured by the solar radiation sensor 7, whereas a light is measured by the first (or the second) light detecting sensors, the control unit 8 may be configured to output an alert signal. The alert signal may inform a user about a failure of the solar radiation sensor 7. Preferably, the control unit 8 is configured to perform the self-functionality check of the solar radiation sensor 7 in night time, that is when the solar radiation Is not measured by the solar radiation sensor 7.

Hereinafter, it is described the path followed by the light emitted from the light-emitting source 5. As above described, the light-emitting source 5 is arranged such that a light exterior to the dome 1 of the pyranometer 100 does not directly impinge on the at least one light emitting source 5. The light emitting source 5 is configured to emit light substantially directed to a portion of the diffusor 4. In other words, light emitted from the light-emitted source 5 at least partly is directed so as to hit, or Impinge, on at least a portion of the diffusor 4. For example, the light may be directed to the side surface 43 of the diffusor 4 and/or to the bottom or second surface 42 of the diffusor 4.

Particularly, the light emitted from the light emitting source 5 may be incident on the diffusor 4 with an angle that is preferably lower than about 90°. In other words, the light emission direction and the longitudinal axis X of the diffusor 4 form an angle that is lower than about 90°. The light emitted from the light-emitting source 5 may be configured as a divergent light beam, that is diverging in the direction of the diffusor 4.

The diffusor 4 particularly is configured to diffuse the light emitted from the at least one light emitting source 5 on an inner surface 12 of the dome 1. In other words, the light emitted from the light-emitting source 5 can be uniformly diffused by the diffusor 4 toward the inner surface 12 of the dome 1, as shown in FIGS. 3 and 5. The light diffused toward the inner surface 12 of the dome 1 is then reflected from the dome 1 and/or the soiling P thereon back in the direction of the of the one or more first light detecting sensor 6a. In other words, the light reflected from the dome 1 and/or the soiling P thereon impinges on one or more first light detecting sensor 6a. Accordingly, the intensity of the light reflected from the dome 1 can measured by each of the one or more of the first light detecting sensors 6a.

As shown in FIG. 4, the light emitting source 5 may be also configured to emit a light substantially directed to a portion of the diffusor 4. In other words, the light emitted from the light-emitted source 5 is directed so as to hit or impinge at least a portion of the diffusor 4. For example, the light may be directed to the bottom or second surface 42 of the diffusor 4. Particularly, the light emitted from the light emitting source 5 may be incident on the diffusor 4 with an angle that is preferably lower than about 90°. In other words, the light emission direction and the longitudinal axis X of the diffusor 4 form an angle that is lower than about 90°. The light emitted from the light-emitting source 5 particularly may be configured as a divergent light beam, that Is diverging in the direction of the diffusor 4.

The diffusor 4 may be also configured to diffuse the light emitted from the at least one light emitting source 5 on the at least one second light detecting sensor 6b arranged in the chamber 20. In other words, the light emitted from the light-emitting source 5 can be reflected from the diffusor 4 back in the direction of the second light detecting sensor 6b. In other words, the light reflected from the dome 1 impinges on the second light detecting sensor 6b. Accordingly, the intensity of the light reflected from the diffusor 4 can (also) measured by the second light detecting sensor(s) 6b, the latter being arranged such that a light exterior to the dome 1 does not directly Impinge on the second light detecting sensor 6b.

An aspect of the present disclosure relates to a method of detecting a soiling on a dome 1 in a pyranometer 100 as above described.

The method specifically comprises a step of emitting a light substantially directed to a portion of a diffusor by at least one light emitting source(s) 5. The light emitting source(s) 5 is arranged such that a light exterior to a dome 1 of the pyranometer does not directly impinge on the at least one light emitting source 5.

The method further comprises a step of measuring or determining an intensity (or an entity corresponding thereto) of the light diffused by the diffusor 4 and reflected from the dome 1 (particularly the inner surface 12 of the dome 1 and/or the outer surface of the dome 1 and/or dirt or soiling on the dome 1) by the one or more first light detecting sensors 6a arranged in a cavity 10 enclosed by the dome 1 of the pyranometer 100.

Particularly, the method may further comprise a step of comparing the Intensity of the light measured by each of the one or more first light detecting sensors 6a with a respective pre-set light intensity value. More particularly, if the Intensity of the light measured by the first light detecting sensor(s) 6a differs from the respective pre-set light Intensity value, particularly by a specified threshold and/or factor, the method comprises a step of emitting or generating a soiling presence signal.

Particularly, the pyranometer 100 may comprise a plurality of first light detecting sensors 8a. More particularly, the method further comprises detecting a difference between the Intensities of the light measured or detected by (particularly each of) the plurality of first light detecting sensors Sa. If a difference in the Intensities of the light measured by (particularly each of) the plurality of first light detecting sensors 6a is detected or determined, the method comprises a step of emitting or generating a first signal, and/or if a difference in the Intensity of the light measured by (particularly each of) the plurality of first light detecting sensors 6a Is not detected or determined (or the determination is below a specified threshold), the method further comprises a step of emitting or generating a second signal, wherein the second signal may be different from the first signal.

Particularly, when a difference in the Intensity of the light measured or detected by the plurality of first light detecting sensors 6a is detected or determined, the method comprises a step of determining at least one azimuthal angle of a point on the dome 1 corresponding to a soiling accumulation, wherein the azimuthal angle is determined based on the difference between the intensity of the light measured by (particularly each of) the plurality of first light detecting sensors 6a and/or the location of the plurality of first light detecting sensors 6a in the chamber 10.

Particularly, the method may comprise a step of emitting a light substantially directed to a portion of the diffusor 4, and measuring or detecting an Intensity of the light reflected from the portion of the diffusor 4 by a second light detecting sensor 6b arranged such that alight exterior to the dome 1 substantially does not directly impinge on the second light detecting sensor 6b.

More particularly, the method may further comprise the step of comparing the intensity of the light measured or detected by the one or more first light detecting sensors 6a and the intensity of the light measured or detected by the second light detecting sensor 6b, and a step of modifying the Intensity of the light measured or detected by the one or more first light detecting sensors 6a if a difference between the intensity of the light measured by the first light detecting sensor 6a and the intensity of the light measured by the second light detecting sensor 6b is detected.

REFERENCE NUMBERS

1 . . . dome
2 . . . pyranometer housing
3 . . . partition wall
4 . . . diffusor
5 . . . light-emitting source(s)
6a . . . first light detecting sensor(s)
8b . . . second light detecting sensor(s)
7 . . . solar radiation sensor
8 . . . control unit
10 . . . cavity
11 . . . outer surface of the dome
12 . . . inner surface of the dome
13 . . . environment external to the pyranometer
14 . . . bottom opening of the dome
15 . . . edge of the dome
20 . . . chamber
21 . . . levelling feet
30 . . . through opening of the partition wall
31 . . . second bottom surface of the partition wall
32 . . . first upper surface of the partition wall
33 . . . perimetral edge
41 . . . top incident surface of the diffusor
42 . . . bottom surface of the diffusor
43 . . . side surface of the diffusor
71 . . . receiving surface of the solar radiation sensor
100 . . . pyranometer
200 . . . bottom surface of the chamber
201 . . . opening of the chamber
700 . . . first surface of the solar radiation sensor
701 . . . second surface of the solar radiation sensor
O . . . observer point
P . . . soling particles
RP . . . reference plane
S . . . ground surface
X . . . longitudinal axis of the diffusor V1 . . . first vector
V2 . . . second vector
V3 . . . third vector
α . . . azimuthal angle

The invention claimed is:

1. A pyranometer, comprising:
a dome enclosing a cavity;
at least one light emitting source arranged such that light exterior to the dome does not directly impinge on the at least one light emitting source;
a diffusor;

wherein the at least one light emitting source is configured to emit light substantially directed to a portion of the diffusor, and wherein the diffusor is configured to diffuse the light emitted from the at least one light emitting source on an inner surface of the dome; and one or more first light detecting sensors arranged in the cavity and configured to measure an intensity of the light reflected from the dome and impinging on the one or more first light detecting sensors;

wherein the pyranometer further comprises a control unit operatively connected with the one or more first light detecting sensors, wherein the control unit is configured to compare the intensity of the light measured by the one or more first light detecting sensor with a respective pre-set light intensity value, particularly wherein the control unit is configured to emit a soiling presence signal if the control unit determines that the intensity of the light measured by the one or more first light detecting sensor differs from the pre-set light intensity value particularly by a specified threshold and factor.

2. The pyranometer according to claim 1, further comprising:
a pyranometer housing comprising a chamber, wherein the least one light emitting source is located in the chamber, and
at least one partition wall arranged to at least partially partition the chamber from the cavity such that the light exterior to the dome does not directly impinge on the at least one light emitting source being arranged in the chamber;
wherein the partition wall comprises a through opening, and wherein the diffusor is arranged in the through opening of the partition wall.

3. The pyranometer according to claim 1, comprising a plurality of first light detecting sensors arranged in the cavity, wherein the plurality of first light detecting sensor are arranged substantially symmetrically.

4. The pyranometer according to claim 1, comprising a solar radiation sensor being arranged to detect light exterior to the dome at least partly impinging on the solar radiation sensor through the diffusor, wherein the solar radiation sensor includes at least one thermopile and/or at least one photodiode.

5. The pyranometer according to claim 1, the pyranometer comprising a plurality of first light detecting sensors, wherein the control unit is further configured to compare the intensities of the light measured by each of the plurality first light detecting sensors, particularly wherein if a difference in the intensities of the light measured by each of the plurality of first light detecting sensors is detected by the control unit, the control unit is configured to emit a first signal, and/or if a difference in the intensities of the light measured by each of the plurality of first light detecting sensors is not detected by the control unit, the control unit is configured to emit a second signal, wherein the second signal is different from the first signal.

6. The pyranometer according to claim 5, wherein if a difference in the intensities of the light measured by the plurality of first light detecting sensors is detected by the control unit, the control unit is configured to determine an azimuthal angle of a point on the dome corresponding to a soiling accumulation, wherein the azimuthal angle is determined based on the difference between the intensities of the light measured by the plurality of first light detecting sensors and the location of the plurality of first light detecting sensors in the cavity.

7. The pyranometer according to claim 1, further comprising at least one second light detecting sensor, wherein the second light detecting sensor is arranged such that a light exterior to the dome does not directly impinge on the second light detecting sensor, and wherein the second light detecting sensor is arranged so as to detect a light emitted from the light emitting source, reflected from the diffusor and impinging on the second light detecting sensors.

8. The pyranometer according to claim 7, wherein the control unit is configured to:
compare the intensity of the light measured by the one or more first light detecting sensors and the intensity of the light measured by the second light detecting sensor, and
modify the intensity of the light measured by the one or more first light detecting sensors if a difference between the intensity of the light measured by the one or more first light detecting sensors and the intensity of the light measured by the second light detecting sensor is detected by the control unit.

9. The pyranometer according to claim 1, wherein the at least one light emitting source is configured to emit a light flash, and wherein the control unit is configured to compare a light flash intensity measured by the one or more first light detecting sensors and the light flash intensity measured by a solar radiation sensor.

10. A method of detecting a soiling on a dome in a pyranometer, comprising:
emitting light substantially directed to a portion of a diffusor by at least one light emitting source, wherein the at least one light emitting source is arranged in the pyranometer such that a light exterior to a dome of the pyranometer does not directly impinge on the at least one light emitting source;
measuring an intensity of the light diffused by the diffusor and reflected from the dome by one or more first light detecting sensors arranged in a cavity enclosed by the dome of the pyranometer;
comparing the intensity of the light measured by the one or more first light detecting sensor with a respective pre-set light intensity value; and
emitting a soiling presence signal if the intensity of the light measured by the one or more first light detecting sensor differs from the pre-set light intensity value particularly by a specified threshold and factor.

11. A method of detecting a soiling on a dome in a pyranometer according to claim 10, wherein the pyranometer comprises a plurality of first light detecting sensors, the method further comprising:
comparing the intensities of the light measured by each of the plurality of first light detecting sensors; and
emitting a first signal if a difference in the intensities of the light measured by each of the plurality of first light detecting sensors is detected, and/or
emitting a second signal if a difference in the intensities of the light measured by each of the plurality of first light detecting sensors is not detected, wherein the second signal being different from the first signal;
wherein when a difference in the intensities of the light measured by the plurality of first light detecting sensors is detected, determining an azimuthal angle of a point on the dome corresponding to a soiling accumulation, wherein the azimuthal angle is determined on the difference between the intensity of the light measured by each of the plurality of first light detecting sensors and the location of the plurality of first light detecting sensors in the chamber.

12. A method of detecting a soiling on a dome in a pyranometer according to claim 10, further comprising:
- emitting a light substantially directed to a portion of the diffusor; and
- measuring an intensity of the light reflected from the portion of the diffusor by a second light detecting sensor arranged such that a light exterior to the dome does not directly impinge on the second light detecting sensor;
- comparing the intensity of the light measured by the one or more first light detecting sensors and the intensity of the light measured by the second light detecting sensor; and
- modifying the intensity of the light measured by the one or more first light detecting sensors if a difference between the intensity of the light measured by the first light detecting sensor and the intensity of the light measured by the second light detecting sensor is detected.

* * * * *